W. FARRAH.
AUTOMATIC REEL FOR CLOTHES LINE.
No. 106,146. Patented Aug. 9, 1870.
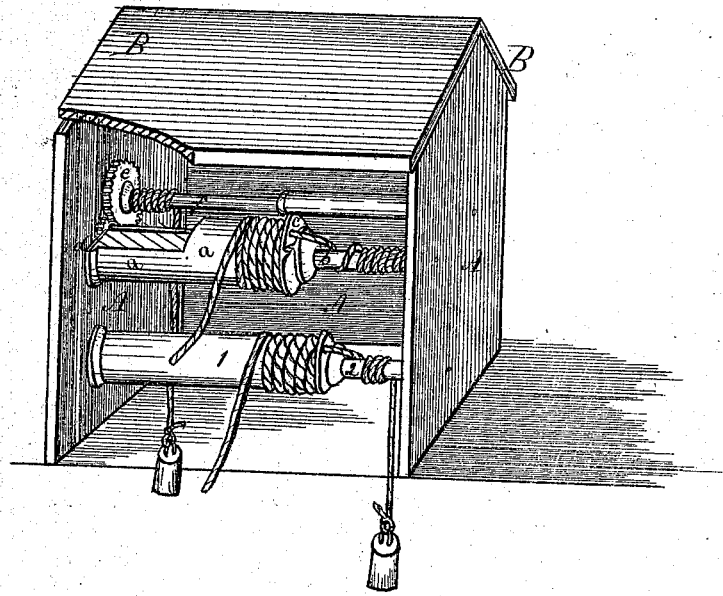
Witnesses.
Seth W. Young
Wm. D. Booton
William Farrah
Inventor.
Thomas G. Orwig
Attorney.

United States Patent Office.

WILLIAM FARRAH, OF DES MOINES, IOWA.

Letters Patent No. 106,146, dated August 9, 1870.

IMPROVEMENT IN AUTOMATIC REELS FOR CLOTHES-LINES.

The Schedule referred to in these Letters Patent and making part of the same

I, WILLIAM FARRAH, of Des Moines, in the county of Polk and State of Iowa, have invented certain Improvements in Reels for Lines, of which the following is a specification.

My invention consists in placing one or more reels in a box, or its equivalent, in such a manner that, when the line upon the reel is drawn out, another line with a weight attached will, by the same action, be wound upon a shaft in the reverse direction, so that, when the weight descends, it will draw in the first line and wind it upon the reel again.

The drawing is a perspective view of two different reels in one box, with lines upon them ready for use.

A A A represent three sides of the box, and the bottom and front of the box open.

B B is the roof the box.

1 2 is a single reel upon a shaft.

The reel may be hollow and play upon a fixed shaft, or it may have journals upon its ends, and bearings or boxing, upon which the journals will play. One-fourth of the length of the reel is reduced in circumference. The diameter of the small end is only one-fourth the diameter of the large end. It requires only one foot of line on the small end to operate four feet on the large end. This difference may be increased or decreased, as desired. The line with the weight attached is wound toward the right, and the other the reverse way. The drawing shows only one line, and represents it passing through a hole in the rim or shoulder, which forms a division of the reel. This hole serves as a fastening for the line, and also affords a means of regulating the length of that part of the line that is drawn out for use. A separate line for the weight may be used or not, as desired.

*a a* is a double reel, with part removed, placed above the single reel.

*b* is the detached and small part of it.

*c* is a disk, secured on the right end of the reel. This disk has projections on its outside surface, which catch or interlock with corresponding projections on the disk, upon the detached reel *b*.

*d* is a disk, secured to the left end of the reel. A pinion is attached to this disk, and may be cast solid with the disk.

*e* is a cog-wheel on the end of the shaft *f*, and connects with the pinion.

To operate this double reel, a line with a weight attached is wound upon the shaft *f*. Another line is attached to the reel *a a*. The gravity of the weight will turn the shaft and the cog or drive-wheel, and communicate motion to the reel through the pinion. This action will wind the line upon the reel. Drawing out the line will reverse the action and wind up the weighted line. The detached part of the reel is loose upon the shaft, and may be shifted, so that it can move independently. The line is fastened to this, and as much can be wound upon it as is necessary to regulate the amount of line to be used. By passing it through the hole in the disk *c* the two reels will be drawn together, and the projections will interlock. By this combination I provide a complete and simple means of taking up and regulating the length of the line to be used.

The box and the reels may vary in form and size, and be adapted for holding, operating, and protecting clothes-lines, or any line, strap, rope, chain, or cord that needs to be stretched out for use.

I am aware that there is nothing new in the mechanism of my reels, excepting the peculiar manner in which they are shaped, combined, and operated.

Claim.

I claim as my invention—

The covered box A A A, or its equivalent, the single reel 1 2, the double reel *a a* with its detached part *b*, the disk *c* with a hole and catches, the disk *d* with a pinion attached, the drive-wheel *e*, the shaft *f*, all made, combined, and operated with the lines and weights, substantially as described and for the purposes specified.

WILLIAM FARRAH.

Witnesses:
J. S. POLK,
F. M. HUBBELL.